(12) United States Patent
Fujita

(10) Patent No.: US 6,449,069 B1
(45) Date of Patent: Sep. 10, 2002

(54) OPTICAL TRANSMISSION EQUIPMENT AND METHOD OF TRANSMITTING AN OPTICAL SIGNAL

(75) Inventor: Hiroyuki Fujita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/260,819

(22) Filed: Mar. 2, 1999

(30) Foreign Application Priority Data

Feb. 1, 1999 (JP) .......................................... 11-023470

(51) Int. Cl.[7] .................................................. H04J 14/00
(52) U.S. Cl. ........................................ 359/123; 359/135
(58) Field of Search .............................. 359/123, 139, 359/135; 370/294

(56) References Cited

U.S. PATENT DOCUMENTS

| 5,144,466 | A | | 9/1992 | Nakamura et al. .......... 359/123 |
|---|---|---|---|---|
| 5,343,314 | A | | 8/1994 | Nakamura et al. .......... 359/123 |
| 5,627,925 | A | * | 5/1997 | Alferness et al. ............. 385/17 |
| 5,938,309 | A | * | 8/1999 | Taylor ......................... 359/124 |
| 6,226,296 | B1 | * | 5/2001 | Lindsey et al. ............. 370/401 |

OTHER PUBLICATIONS

English Abstract of Japanese Patent Application Publication No. 07–307719, published Nov. 21, 1995.
"Integrated Lightwave Networks" Fujitsu.48, 5 pp 436–441, 09/97.
"NECSpectral Wave Wavelength Division Multiplexing System" Brochure by NEC.

* cited by examiner

*Primary Examiner*—Jason Chan
*Assistant Examiner*—Christina Y Leung
(74) *Attorney, Agent, or Firm*—Sofer & Haroun, LLP

(57) ABSTRACT

Optical transmission equipment according to the present invention time-division multiplexes a plurality of relatively low-speed optical signals from a tributary side using a TDM MUX to a signal with a specific wavelength $\lambda_1$, wavelength-multiplexes it together with other relatively high-speed wavelengths $\lambda_2 \ldots \lambda_n$ from the tributary side using a WDM MUX, and outputs the multiplexed signal $\lambda_1\text{-}\lambda_n$ to an aggregate side. The equipment also receives the optical signals $\lambda_1\text{~}\lambda_n$ from the aggregate side, performs an operation reverse to the one described above, and outputs demultiplexed signals to the tributary side.

4 Claims, 16 Drawing Sheets

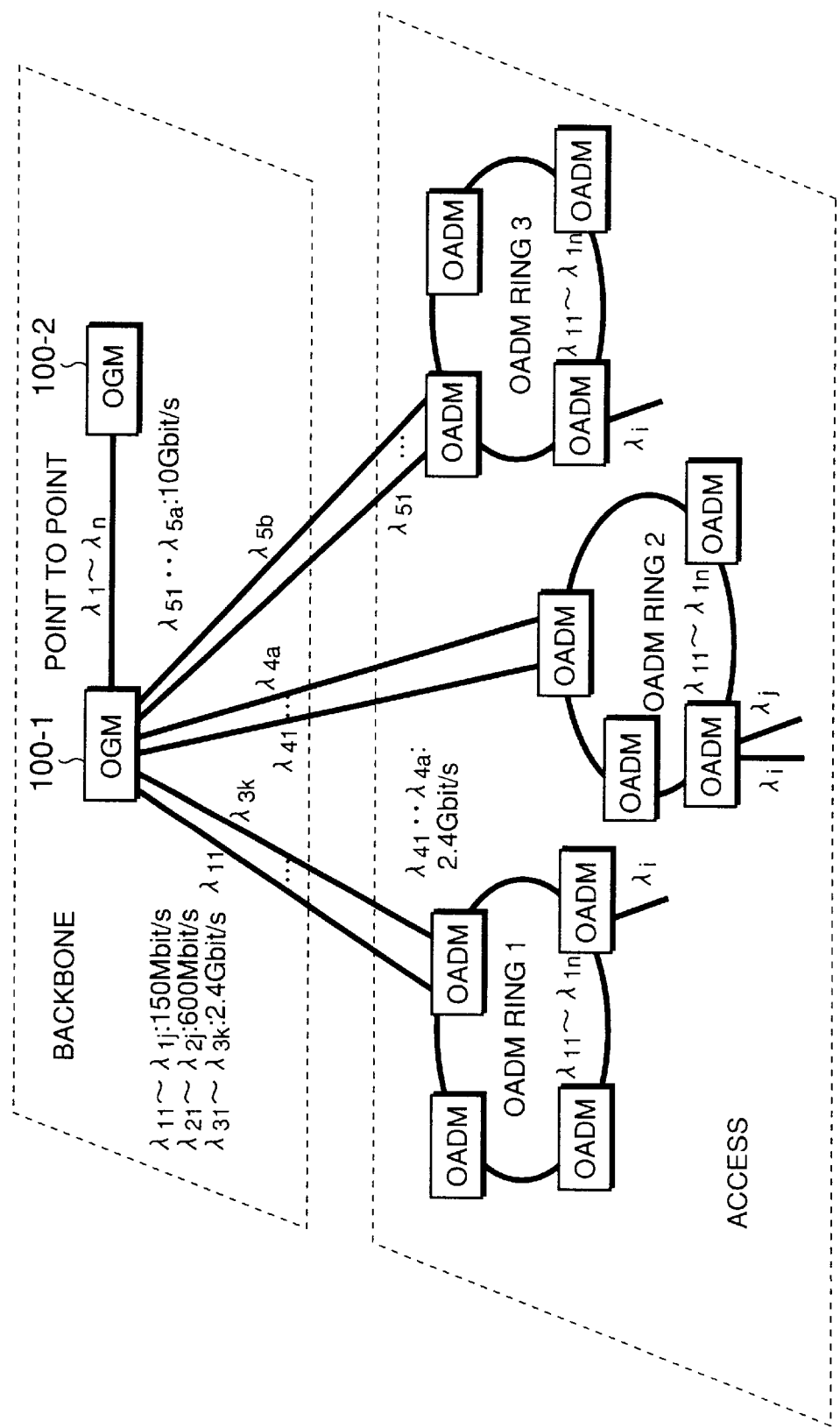

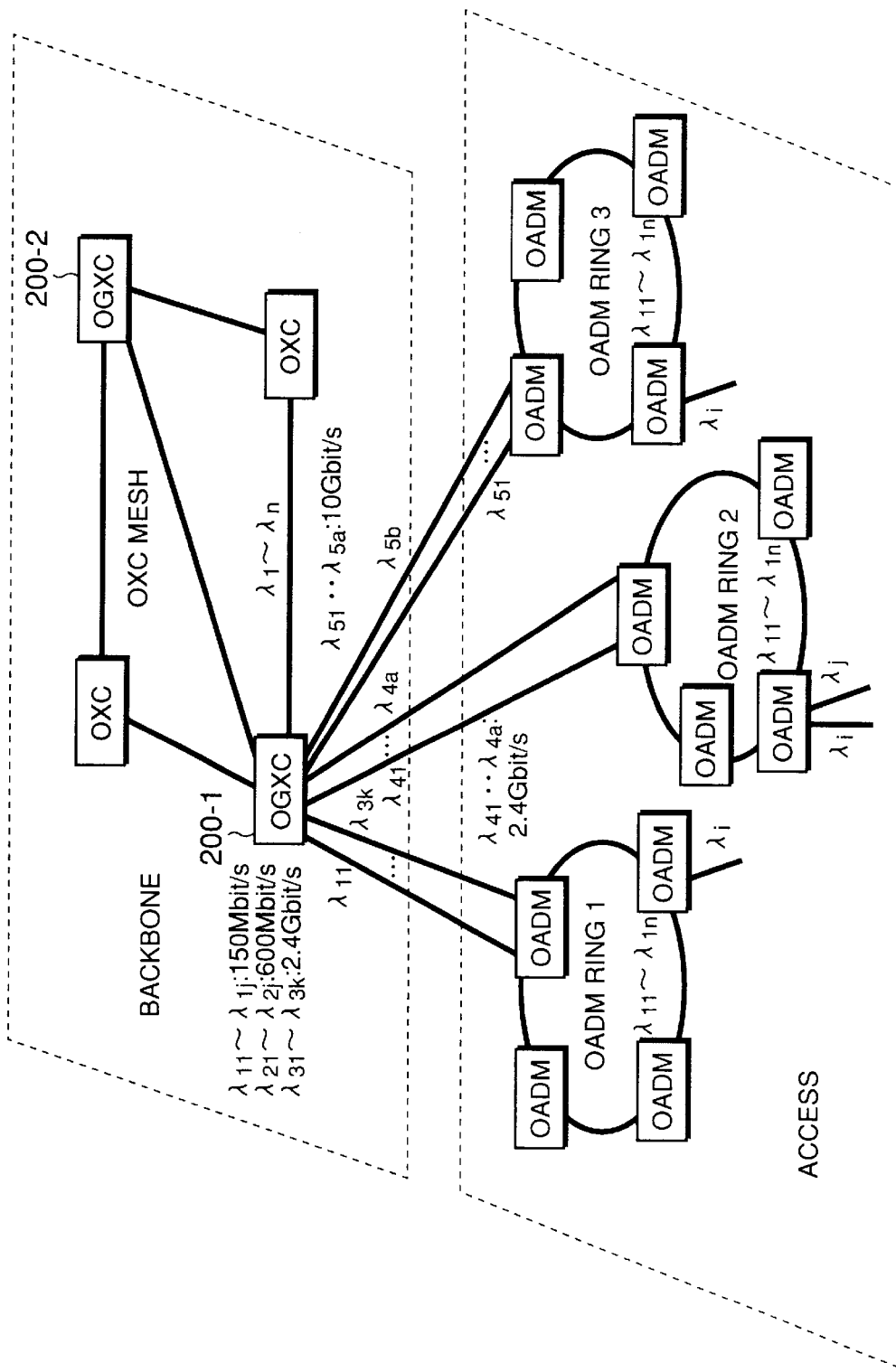

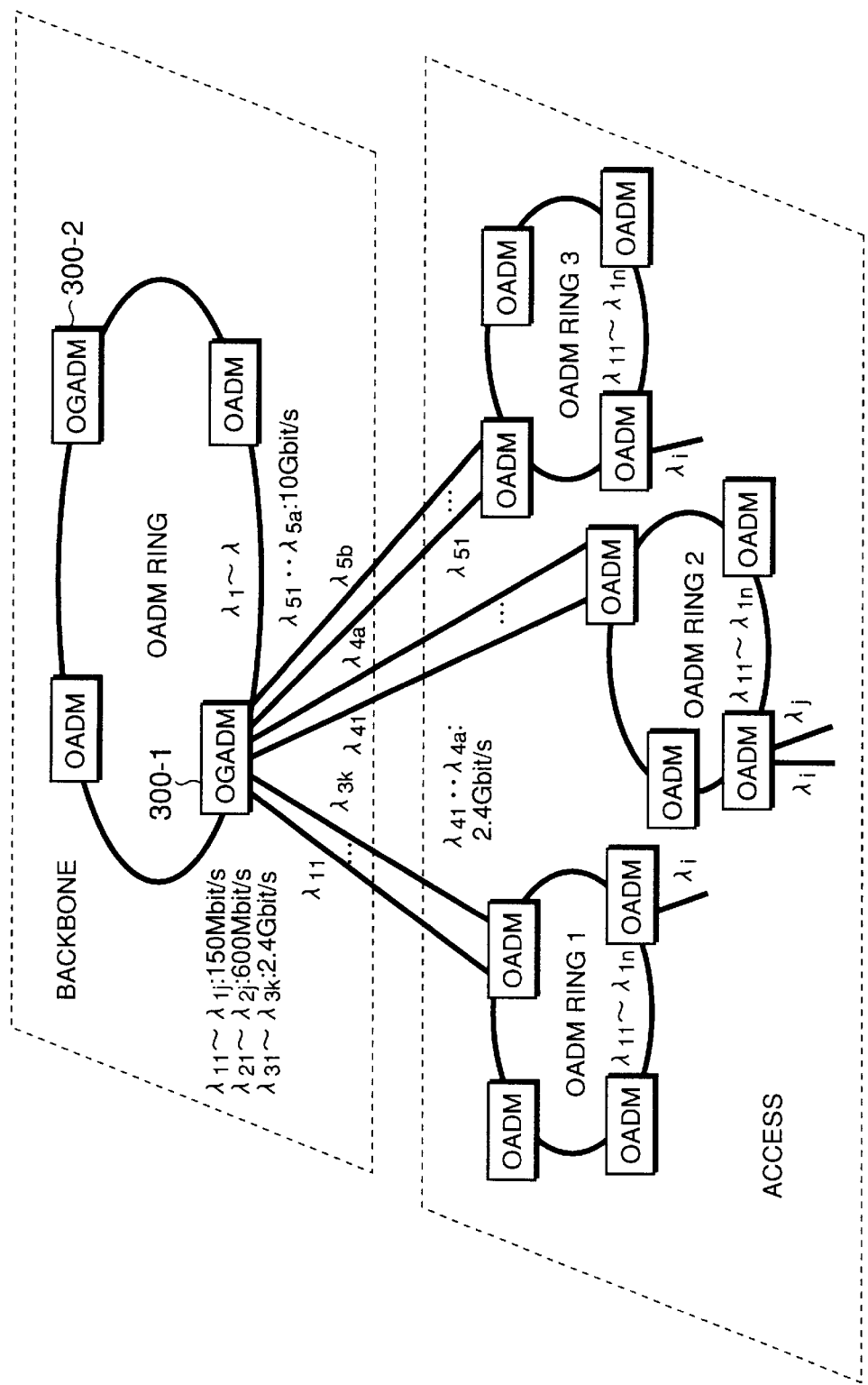

OPTICAL TRANSMISSION EQUIPMENT AND METHOD OF TRANSMITTING AN OPTICAL SIGNAL

BACKGROUND OF THE INVENTION

This invention relates to an optical network element (hereafter called an O-NE), which is optical transmission equipment for use in an all-optical network using multiplexing/demultiplexing routing based on optical wave length, and to an optical transmission method.

Recently, as the amount of data traffic has increased rapidly, a need has arisen for a higher, larger-capacity transmission network. Conventionally, a network element (hereafter called an NE) for use on a transmission network has used Time Division Multiplexing (hereafter called TDM). To process a large volume of transmission data, an NE using Wavelength Division Multiplexing (WDM) has become popular on a network. The introduction of WDM has led an O-NE to employ not only optical wavelength multiplexing but also optical wavelength switching and routing.

FIG. 1 is a diagram showing an optical wavelength division multiplexing equipment (hereafter called WDM) which is an O-NE. The WDM wavelength-multiplexes the optical signal $\lambda_1$ (optical wavelength: $\lambda_1$), optical signal $\lambda_2$, . . . , and optical signal $\lambda_n$ transmitted from the tributary side through n optical fibers to optical signals (optical wavelength: $\lambda_1 \sim \lambda_n$ and sends them to one aggregate fiber. The WDM demultiplexes the multiplexed optical signals (optical wavelength: $\lambda_1 \sim \lambda_n$) from the aggregate side.

In this specification, the swung dash (~) is used to indicate wavelength-multiplexed signals, and the ellipses (. . . ) to indicate signals not wavelength-multiplxed.

In addition to the WDM, there are other O-NEs: an Optical Add-Drop Multiplexer (hereafter called OADM) and an Optical Cross-Connect (hereafter called OXC).

FIG. 2 shows the OADM. The OADM receives wavelength-multiplexed optical signals (optical wavelength: $\lambda_1 \sim \lambda_n$) from the West aggregate side and, with the use of the optical drop function, drops optical signals $\lambda_i$ and $\lambda_j$ onto the tributary side. The OADM passes signals with other wavelengths. At the same time, the OADM receives the optical signals $\lambda_i$ and $\lambda_j$ from the tributary side and, with the optical add function, and adds and wavelength-multiplexes them to the West aggregate side or East aggregate side. The OADM processes optical signals from the East aggregate side (optical wavelength: $\lambda_1 \sim \lambda_n$) in the same way it processes the signals from the West aggregate side.

FIG. 3 is a diagram showing the OXC. The OADM has one fiber connected to each aggregate side, while the OXC has multiple fibers connected to each aggregate side. The OADM adds and drops optical signals only on a wavelength level, while the OXC adds and drops optical signals not only on a wavelength level but also on an optical fiber level. This allows the OXC to cross-connect optical signals on a large scale. To do so, it sometimes requires the function to perform optical wavelength conversion.

FIGS. 4, 5, and 6 show some examples in which an all-optical network using O-NEs is built. Routing paths, which have been set up electrically in the conventional network, are set up optically in the all-optical network. This means that the all-optical network can handle a large number of broad-band signals. One of the problems with building the all-optical network is the number of multiplexed wavelengths in WDM.

The optical wavelength used for WDM is defined by ITU-T as about 1550 nm. The number of multiplexed wavelengths using this wavelength is approximately 40 or so, with the maximum being 80–100. For optical path routing in the all-optical network, one wavelength is assigned to transmission from one end customer to another end customer. Therefore, the number of wavelengths is a bottleneck of building a large network. Especially, in a backbone network where a large number of optical signals are received from access networks, the limit on the number of wavelengths is a serious problem.

Earlier patent disclosures relating to the present invention are found in Japanese Patent Application No. Hei 2-162939 (U.S. Pat. Nos. 5,144,466 and 5,343,314) and in Japanese Patent Application No. Hei 7-30771. However, the problem described above is not described in these patent applications. The optical cross-connect and optical ADM technology are described in "Integrated Lightwave Networks" (FUJITSU 48, 5, 436-411).

SUMMARY OF THE INVENTION

In view of the foregoing, it is an object of the present invention to provide optical transmission equipment, that is an O-NE, and optical transmission method which solve the problems involved in building a large optical network and which help to build an efficient and economical all-optical network.

In the all-optical network, optical signals from the nodes of end customers are routed at an optical wavelength level to form a network. An optical signal itself has various bit rates. In SDH/SONET networks, low-speed systems use 50 Mb/s, 150 Mb/s, and 600 Mb/s, and high-speed systems use 2.4 Gb/s and 10 Gb/s. In non-SDH/SONET networks, low-speed units use 45 Mb/s, 100 Mb/s, and 200 Mb/s and high-speed units use 1 Gb/s. The bit rate of many optical signals from end customer nodes in access networks, for example, from those in SDH/SONET networks, is 2.4 G/s or lower. The bit rate of most signals is 600 Mb/s or lower.

When these optical signals are transmitted over an optical network, many optical wavelengths are necessary because each optical signal requires its own optical wavelength. This makes it difficult to build the network. In addition, in a case of allocating a low bit rate to an optical wavelength, it is not economical in terms of transmission capacity because the optical wavelength originally capable of transmitting a high-speed signal is used for a low-speed signal.

In view of the foregoing, the O-NE according to the present invention multiplexes a plurality of relatively low-speed optical signals in the TDM mode to convert them to a high-speed electrical signal. A new type O-NE is provided according to the present invention, which has a function of converting the electrical signal to an optical signal with another optical wavelength in order to solve the above-described problem. The O-NE according to the present invention is called Optical Gateway Equipment.

BRIEF DESCRIPTION OF THE DRAWINGS

Preferred embodiments of the present invention will now be described in conjunction with the accompanying drawings, in which:

FIG. 15 is a diagram showing the configuration of an optical network using the optical gateway equipment of the embodiment of the present invention;

FIG. 16 is a diagram showing the configuration of a network using the cross-connect type optical gateway equipment according to the present invention; and FIG. 17 is a diagram showing the configuration of a network using the OADM type optical gateway equipment according to the present invention.

DESCRIPTION OF THE PREFERRED EMBODIMENTS

An embodiment of the present invention will be described below with a network complying with the SONET (Synchronous Optical Network) standard as an example.

Figure 1:
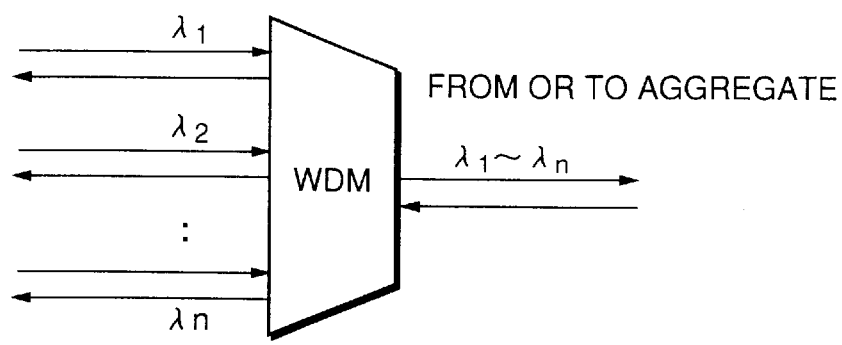
FIG. 1 is a diagram showing a WDM equipment which is an optical network element.
Figure 2:
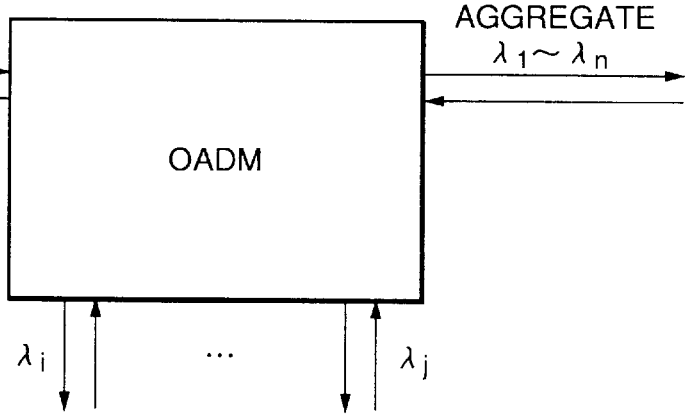
FIG. 2 is a diagram showing an OADM which is an optical network element.
Figure 3:
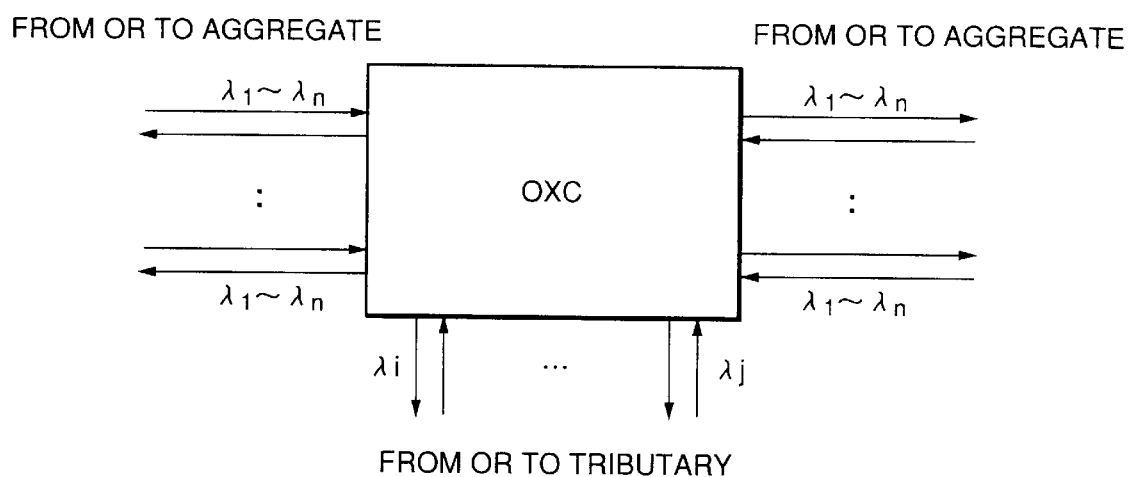
FIG. 3 is a diagram showing an OXC which is an optical network element.
Figure 4:
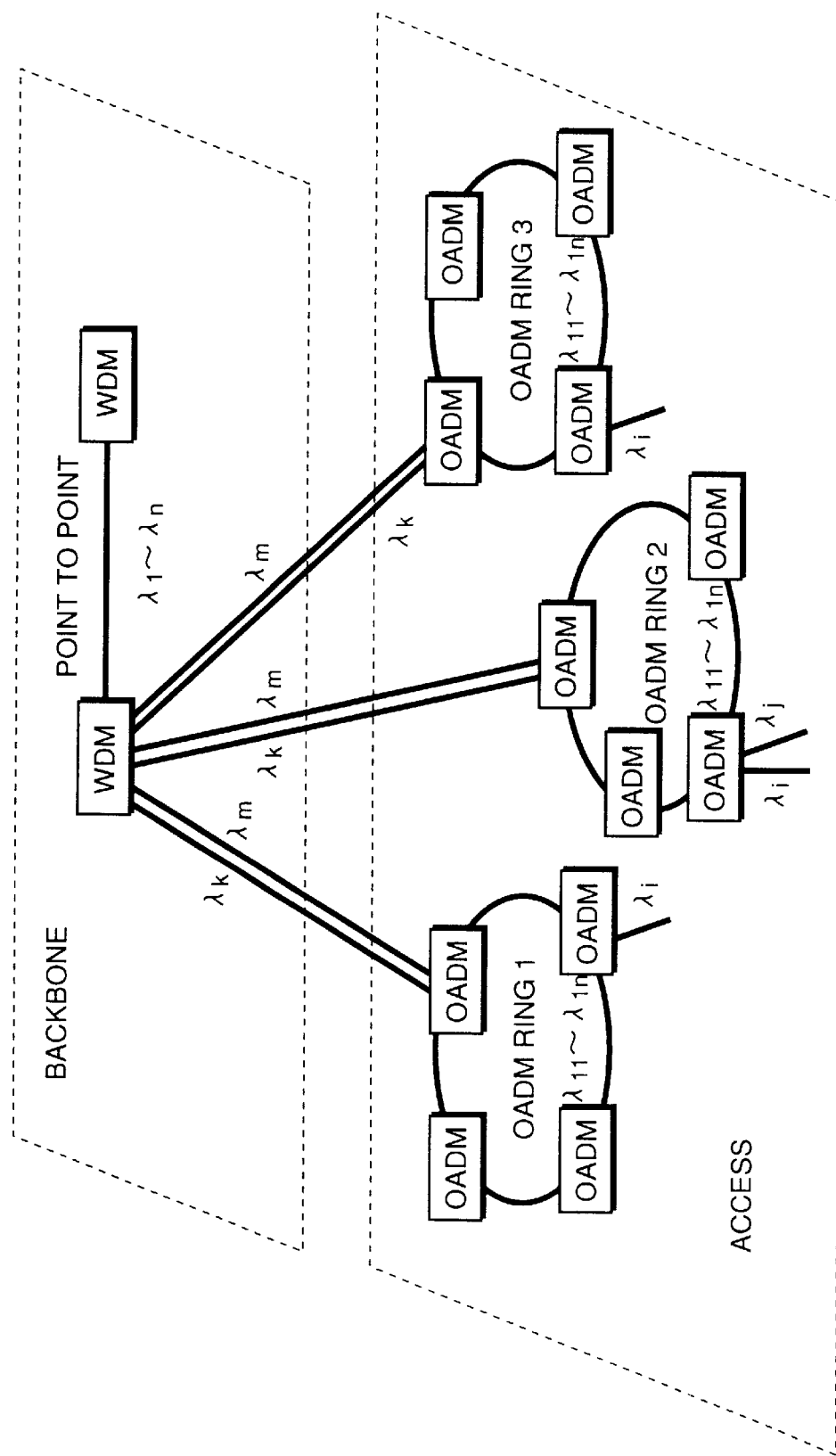
FIG. 4 is a diagram showing an optical network using WDM equipment.
Figure 5:
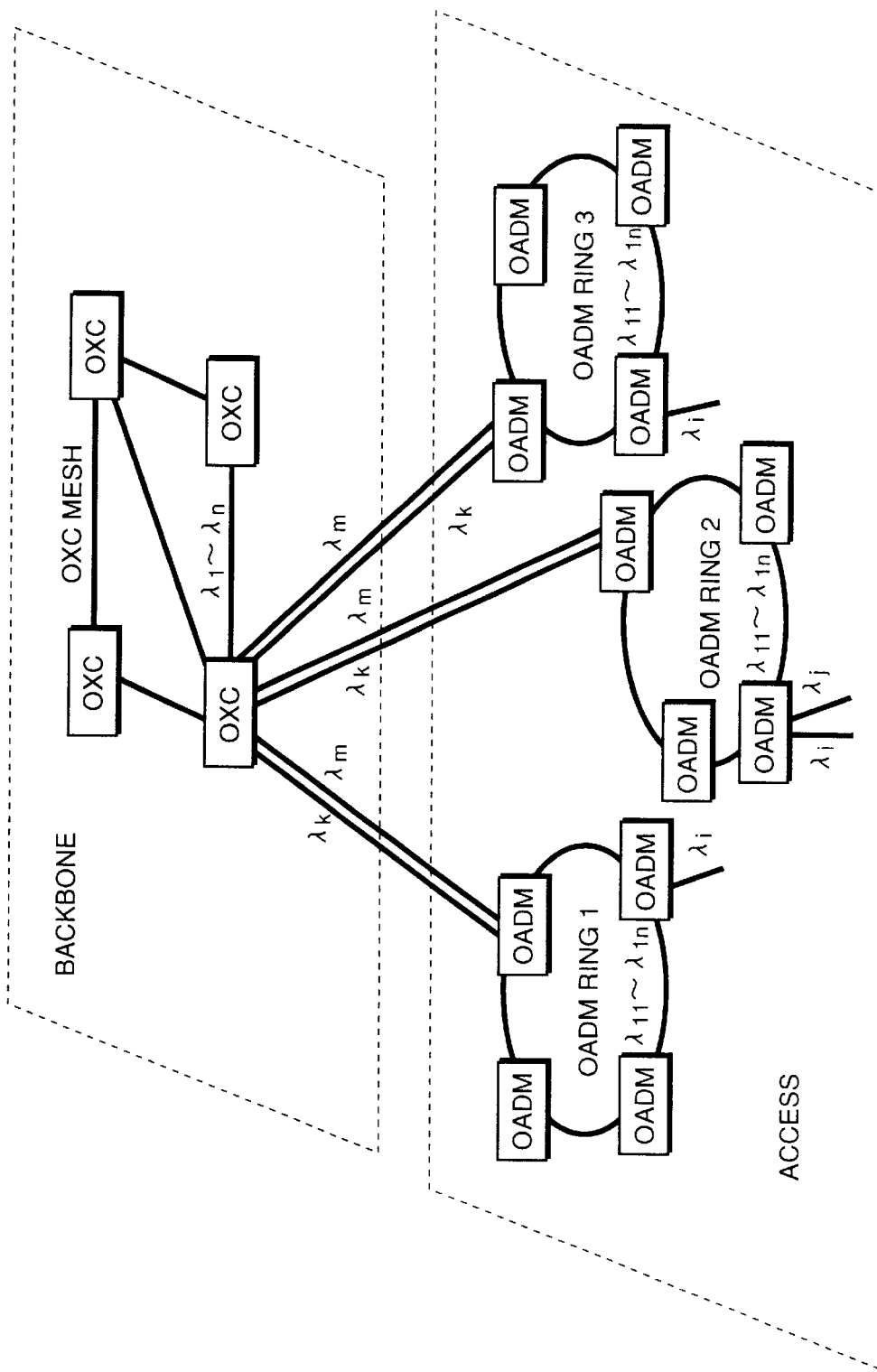
FIG. 5 is a diagram showing an optical network using OXCs.
Figure 6:
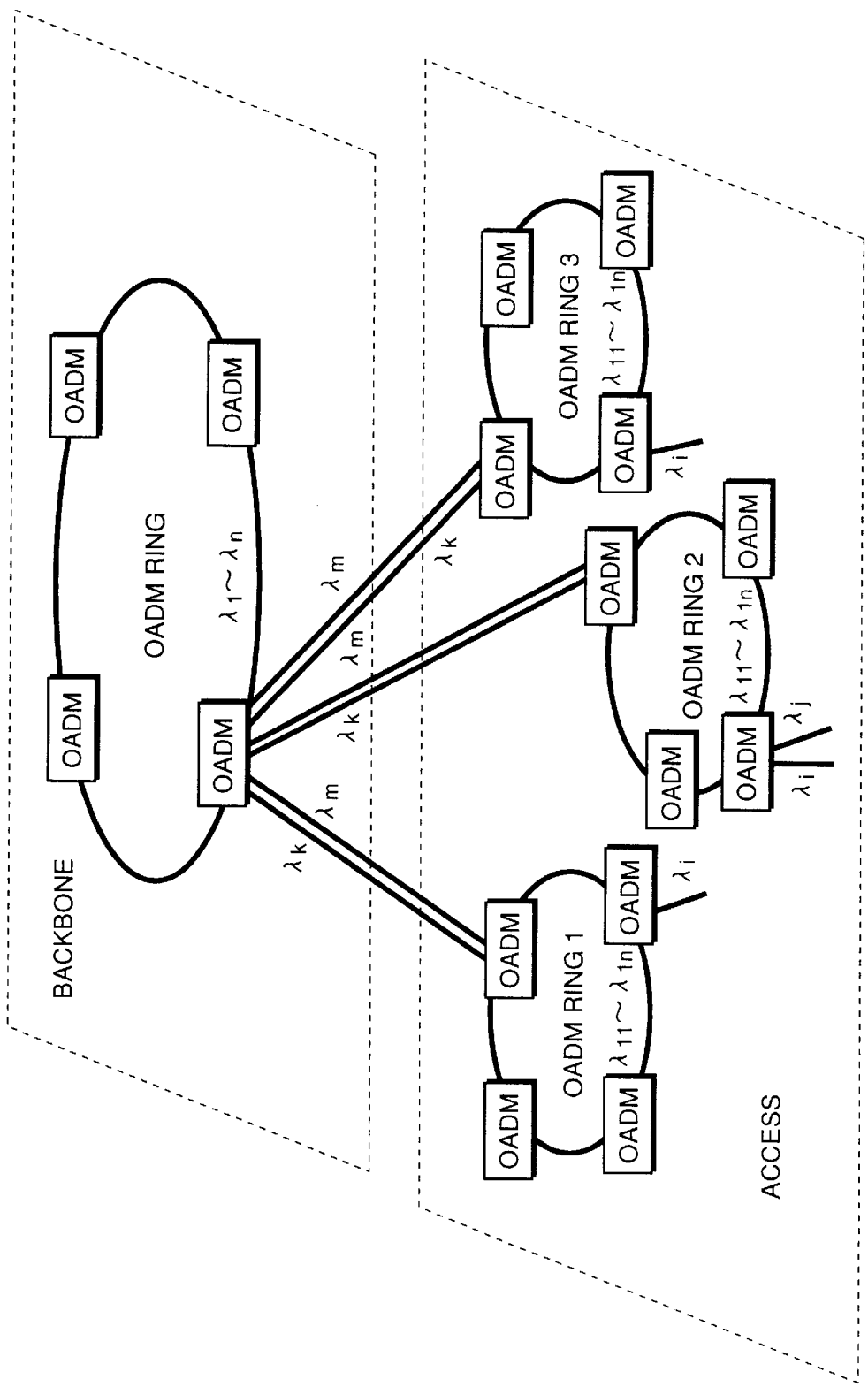
FIG. 6 is a diagram showing an optical network using OADMs.
Figure 7:
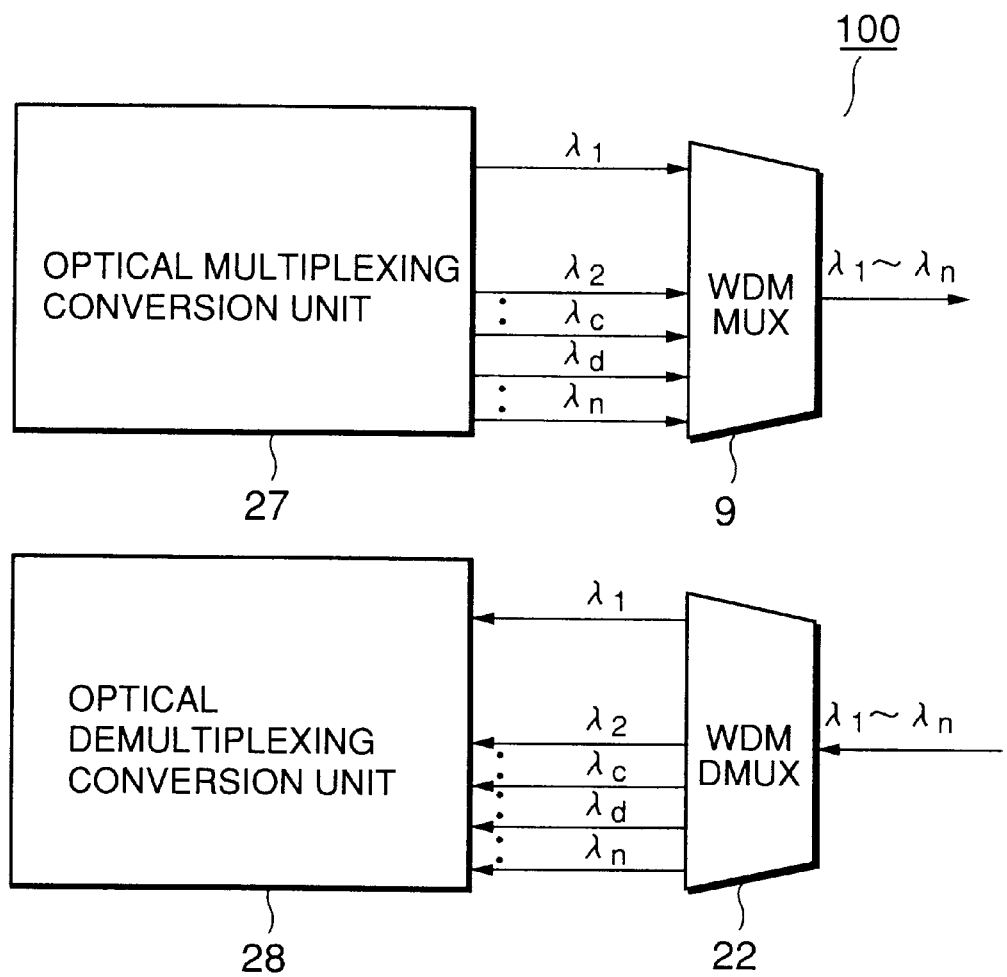
FIG. 7 is a diagram showing the configuration of optical gateway equipment used in an embodiment of the present invention.
Figure 8:
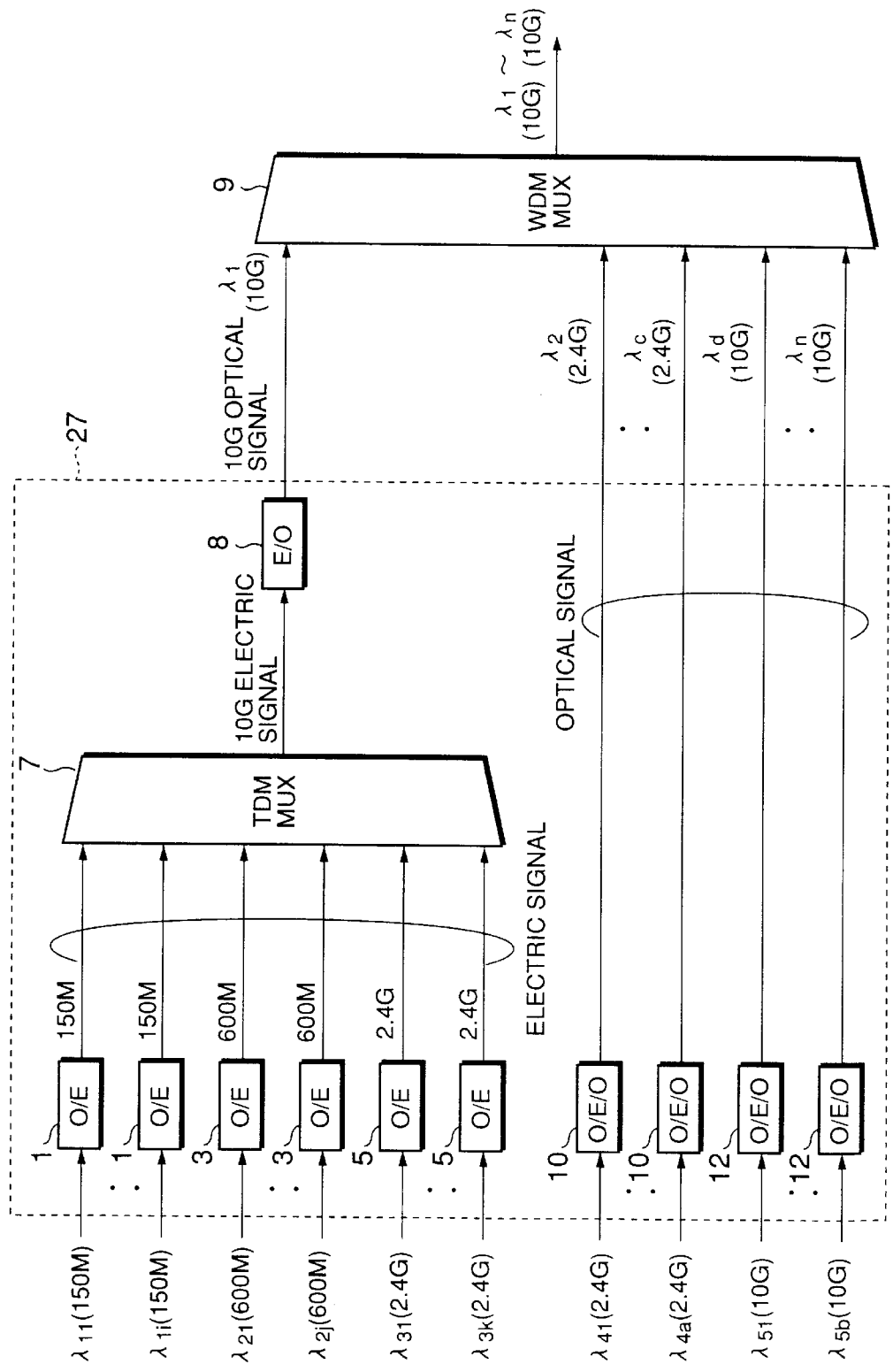
FIG. 8 is a diagram showing the configuration of optical gateway equipment used in the embodiment of the present invention.
Figure 9:
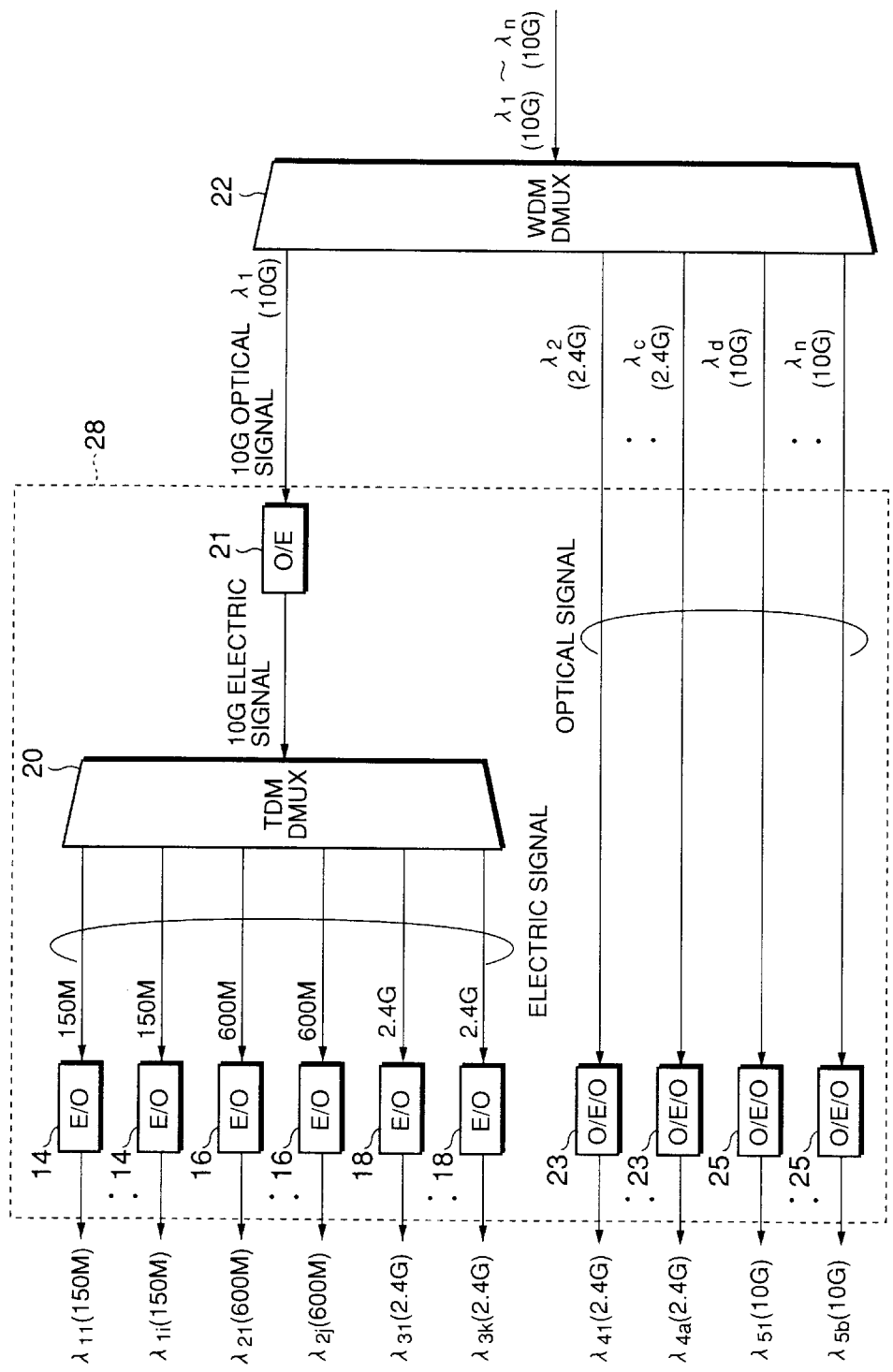
FIG. 9 is a diagram showing the configuration of optical gateway equipment used in the embodiment of the present invention.

First, referring to FIGS. 7, 8, and 9, the optical gateway equipment according to the present invention will be described. FIG. 7 is a diagram showing the optical gateway equipment according to the present invention. FIGS. 8 and 9 are diagrams showing the details of an Optical Multiplexing Conversion Unit (OMCU) 27 and an Optical Demultiplexing Conversion Unit (ODCU) 28 shown in FIG. 7.

Referring to FIGS. 7 and 8, each optical signal of the tributary side is allocated to an optical wavelength. Optical signals $\lambda_{11} \ldots \lambda_{1i}$ with the bit rate of 150 Mb/s (OC-3) are converted to electrical signals with the bit rate of 150 Mb/s by an optical/electrical conversion unit (hereafter called O/E) 1. Similarly, optical signals $\lambda_{21} \ldots \lambda_{2j}$ with the bit rate of 600 Mb/s (OC-12) are converted to electrical signals with the bit rate of 600 Mb/s by an O/E 3. Optical signals $\lambda_{31} \ldots \lambda_{3k}$ with the bit rate of 2.4 Gb/s (OC-48) are converted to electrical signals with the bit rate of 2.4 Gb/s by an O/E 5. These electrical signals with the bit rate of 150 Mb/s, 600 Mb/s, and 2.4 Gb/s are time-division multiplexed by a TDM MUX 7 into an electrical signal with the bit rate of 10 Gb/s. This electrical signal is then converted to the optical signal $\lambda_1$ with the bit rate of 10 Gb/s (OC-192) by an electrical/optical conversion unit (hereafter called E/O) 8.

The number of optical signals ($\lambda_{11} \ldots \lambda_{1i}, \lambda_{21} \ldots \lambda_{2j}, \lambda_{31} \ldots \lambda_{3k}$) from the tributary side is determined by the multiplexing rule of SONET. For example, when there are only 150 Mb/s signals (OC-3), the number of optical signals is 64 (i=64, j=0, k=0); when there are only 600 Mb/s signals (OC-12), the number of optical signals is 16 (i=0, j=16, k=0); when there are only 2.4 Gb/s signals (OC-48), the number of optical signals is 4 (i=0, j=0, k=4). When the signals of 150 Mb/s (OC-3), 600 Mb/s (OC-12), and 2.4 Gb/s (OC-48) are mixed; for example, when there are 16 (sixteen) 150 Mb/s (OC-3) signals, 4 (four) 600 Mb/s (OC-12) signals, and 2 (two) 2.4 Gb/s (OC-48) signals, that is, i=16, j=4, and k=2. In such a way, relatively low bit-rate optical signals are thus aggregated into a high-speed optical signal $\lambda_1$.

The relatively high bit-rate 2.4 Gb/s optical signals (OC-48) $\lambda_{41} \ldots \lambda_{4a}$ from the tributary side are converted to 2.4 Gb/s (OC-48) optical signals $\lambda_2 \ldots \lambda_c$ by an optical/electrical/optical conversion unit (hereafter called O/E/O) 10. The 10 Gb/s (OC-192) optical signals $\lambda_{51} \ldots \lambda_{5b}$ are converted to 10 Gb/s (OC-192) optical signals $\lambda_d \ldots \lambda_n$ by an optical/electrical/optical conversion unit (hereafter called O/E/O) 12.

As described above, the optical signals from the tributary side are aggregated and converted to optical signals $\lambda_1 \ldots \lambda_n$, multiplexed by the WDM MUX 9 into one optical signal $\lambda_1 \sim \lambda_n$, and sent to the aggregate side.

Referring to FIGS. 7 and 9, the optical signals from the aggregate side are converted in the manner reverse to the conversion described above. That is, one optical signal $\lambda_1 \sim \lambda_n$ is demultiplexed to optical signals $\lambda_1 \ldots \lambda_n$ by a WDM DMUX 22. The 10 Gb/s (OC-192) optical signal $\lambda_1$ is converted to a 10 Gb/s electrical signal by an O/E 21, and time-division demultiplexed to 150 Mb/s, 600 Mb/s, and 2.4 Gb/s electrical signals by a TDM DMUX 20. The 150 Mb/s electrical signals are converted to the optical signals $\lambda_{11} \ldots \lambda_{1i}$ by an E/O 14. Similarly, the 600 Mb/s electrical signals are converted to the optical signals $\lambda_{21} \ldots \lambda_{2j}$ by an E/O 16. The 2.4 Gb/s electrical signals are converted to the optical signals $\lambda_{31} \ldots \lambda_{3k}$ by an E/O 18. They are output to the tributary side. In addition, the 2.4 Gb/s (OC-48) optical signals $\lambda_2 \ldots \lambda_c$ are converted to optical signals $\lambda_{41} \ldots \lambda_{4a}$ by an O/E/O 23. The 10 Gb/s (OC-192) optical signals $\lambda_d \ldots \lambda_n$ are converted to optical signals $\lambda_{51} \ldots \lambda_{5b}$ by an O/E/O 25. They are also output to the tributary side.

In this embodiment, (i+j+k) relatively low-speed optical signals are converted to electrical signals, time-division multiplexed, and then converted to a high-speed optical signal with one wavelength. Conversely, a high-speed optical signal with one wavelength is converted to an electrical signal and time-division demultiplexed, and converted into (i+j+k) relatively low-speed optical signals. This alleviates the limit of the number of wavelengths, and enables provision of transmission equipment capable of highly efficient transmission.

Figure 10:
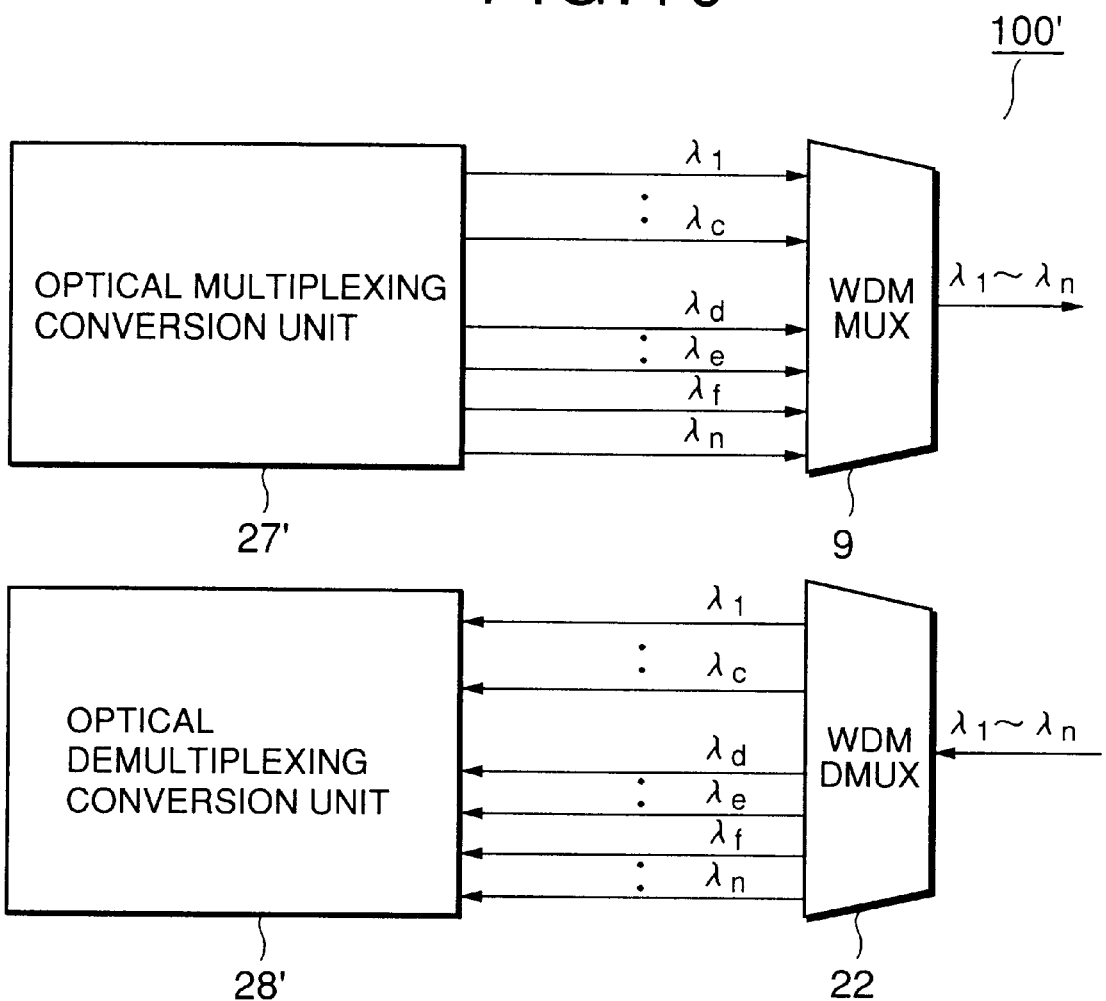
FIG. 10 is a diagram showing the configuration of optical gateway equipment used in the embodiment of the present invention.
Figure 11:
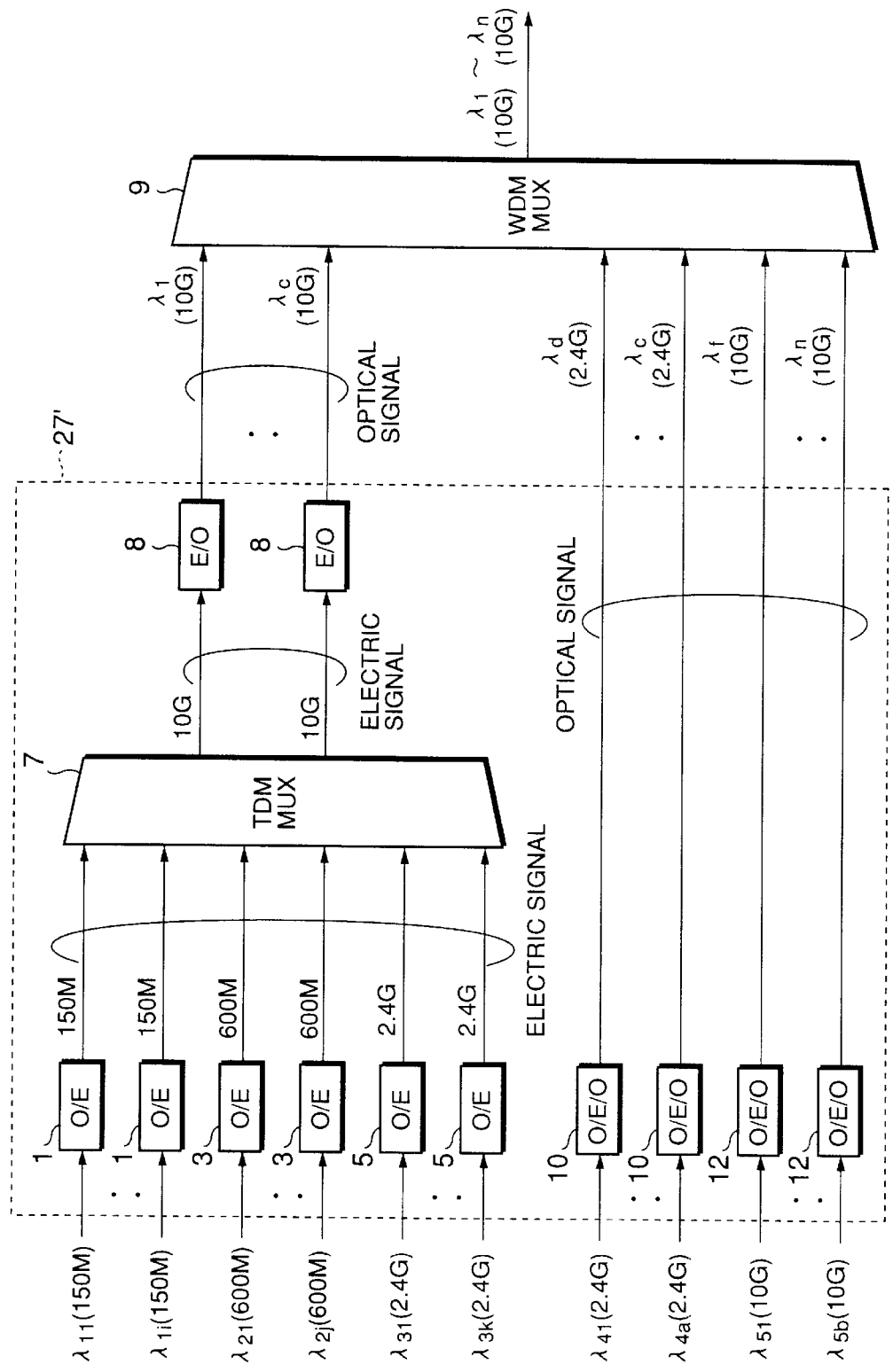
FIG. 11 is a diagram showing the configuration of optical gateway equipment used in the embodiment of the present invention.
Figure 12:
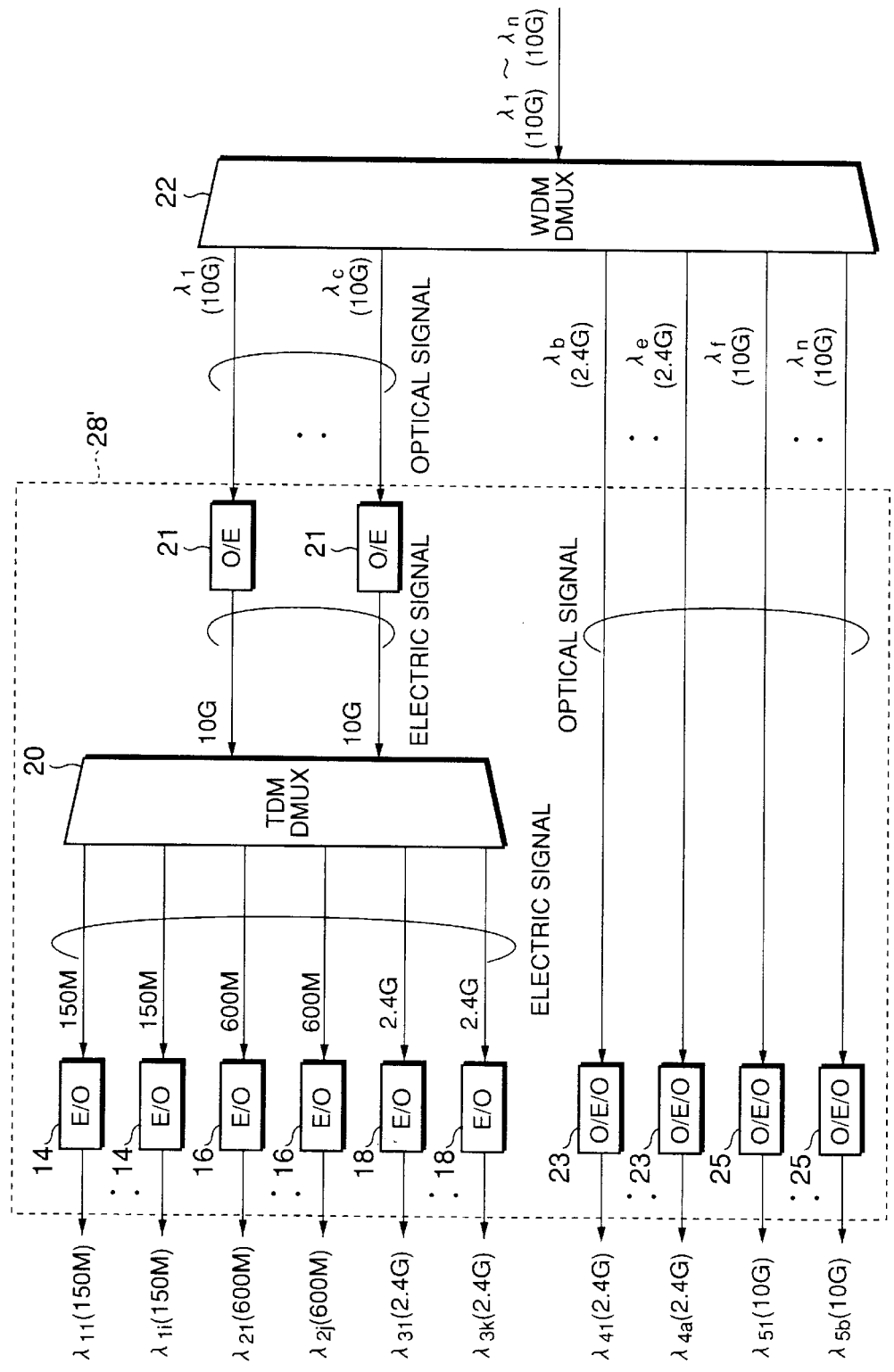
FIG. 12 is a diagram showing the configuration of optical gateway equipment used in the embodiment of the present invention.

Another embodiment of the optical gateway equipment according to the present invention will be described with reference to FIGS. 10, 11, and 12. FIG. 10 is a diagram showing the optical gateway equipment according to the present invention. FIGS. 11 and 12 are diagrams illustrating in detail the optical multiplexing conversion unit 27' and the optical demultiplexing conversion unit 28' shown in FIG. 10.

The present embodiment differs from the embodiment described above in the function to convert relatively low-speed signals to high-speed optical signals through TDM. That is, because the total bandwidth of low-speed optical signals is large, a function in which the low-speed optical signals are aggregated into a plurality of high-seed optical signals is added in the present invention. In this embodiment, the 150 Mb/s, 600 Mb/s, and 2.4 Gb/s electrical signals are time-division multiplexed to 10 Gb/s electrical signals by the TDM MUX 7, and are converted to a plurality of 10 Gb/s (OC-192) optical signals $\lambda_1 \ldots \lambda_c$ by the E/O 8. Conversely, one optical signal $\lambda_1 \sim \lambda_n$ is demultiplexed to the optical signals $\lambda_1 \ldots \lambda_n$ by the WDM DMUX 22. The 10 Gb/s (OC-192) optical signals $\lambda_1 \ldots \lambda_c$ are converted to 10 Gb/s electrical signals by the O/E 21 and are time division demultiplexed to 150 Mb/s, 600 Mb/s, and 2.4 Gb/s electrical signals by the TDM DMUX 20.

In the present embodiment, (i+j+k) relatively low-speed optical signals are converted to electrical signals, time-division multiplexed, and then converted to a plurality of high-speed optical signals each with its own wavelength. Conversely, a plurality of high-speed optical signals each with its own wavelength are converted to electrical signals and time-division demultiplexed, and converted into (i+j+k) relatively low-speed optical signals. This alleviates the limit of the number of wavelengths, providing transmission equipment capable of highly efficient transmission. Compared with the embodiment described above, the present embodiment is advantageous when there are many relatively low-speed optical signals.

Figure 13:
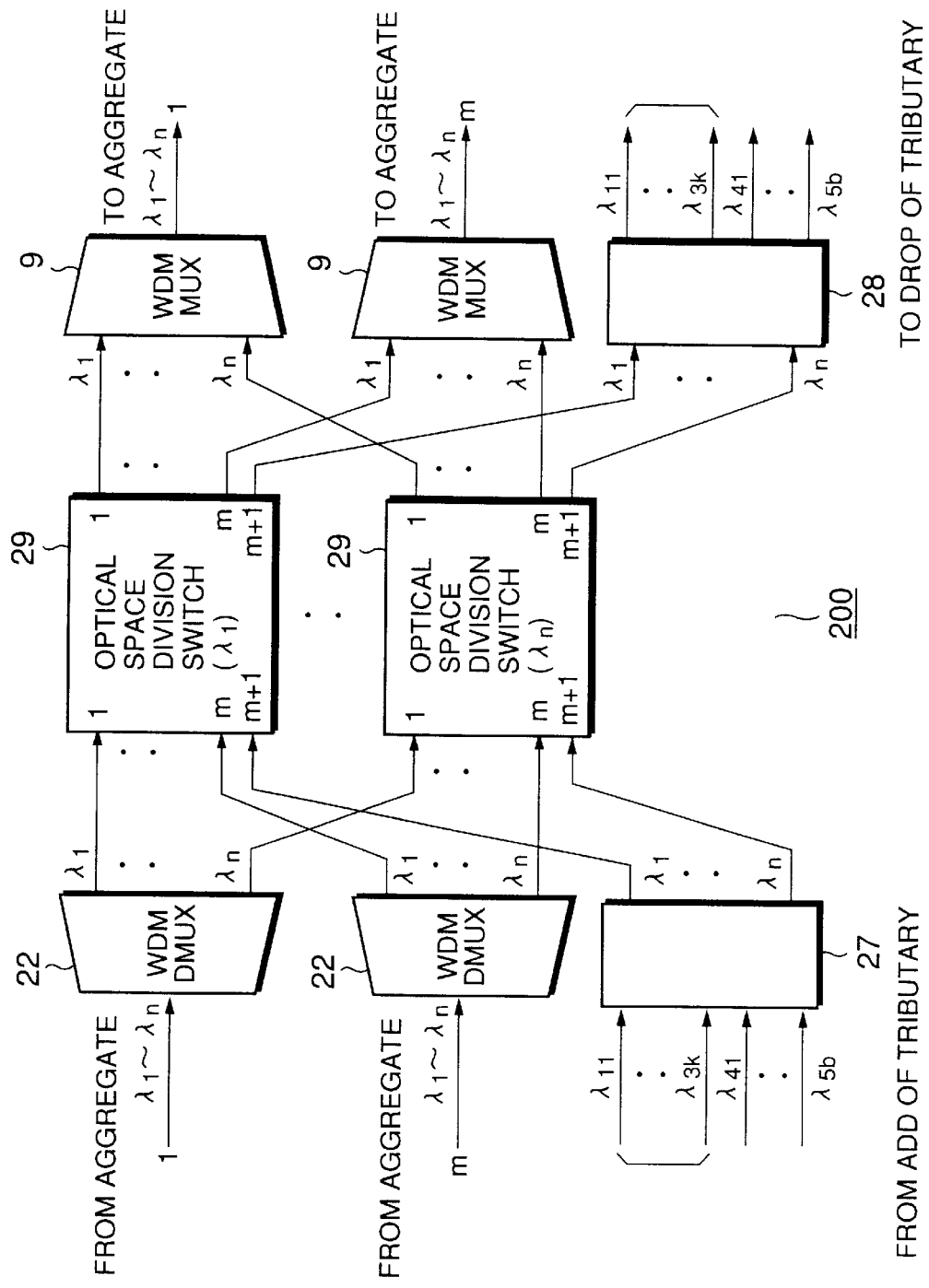
FIG. 13 is a diagram showing the configuration of cross-connect type optical gateway equipment used in the embodiment of the present invention.

A further embodiment according to the present invention will be described with reference to FIG. 13. A cross-connect type optical gateway equipment will be described in this embodiment. On the aggregate side, there are m input optical signals and m output optical signals, each composed of n multiplexed optical signals with wavelengths $\lambda_1 \sim \lambda_n$. On the tributary side, there are input and output demultiplexed optical signals, each composed of optical signals $\lambda_{11} \ldots \lambda_{3k}$ and optical signals $\lambda_{41} \ldots \lambda_{5b}$. When adding signals on the tributary side, the optical multiplexing conversion unit 27 described in the above embodiment aggregates the optical signals $\lambda_{11} \ldots \lambda_{3k}$ into the optical signal $\lambda_1$ and converts the optical signals $\lambda_{41} \ldots \lambda_{5b}$ to optical signals $\lambda_2 \ldots \lambda_n$. They are input to an optical space division switch 29. These optical signals $\lambda_1 \ldots \lambda_n$ are switched by the optical space division switch 29, wavelength-multiplexed by the WDM MUX 9, added to the optical signals $\lambda_1 \sim \lambda_n$, and output to the aggregate sides 1 . . . m. As shown in the figure, if the output port m+1 is selected by the optical space division switch 29, the optical signals may be dropped onto the tributary side instead of being added to the aggregate side.

The optical signals $\lambda_1 \sim \lambda_n$ from the aggregate sides 1 . . . m are demultiplexed by the WDM DMUX 22 to optical signals $\lambda_1 \ldots \lambda_n$ and are input to the optical space division switch 29. These optical signals $\lambda_1 \ldots \lambda_n$ are switched by the optical space division switch 29. The signals to be dropped onto the tributary side are converted to optical signal $\lambda_{11} \ldots \lambda_{3k}$ (generated by demultiplexing the optical signal $\lambda_1$) and optical signals $\lambda_{41} \ldots \lambda_{5b}$ by the optical demultiplexing conversion unit 28 described in the above embodiment. As shown in the figure, when the optical space division switch 29 selects the corresponding output port, the optical signals $\lambda_1 \sim \lambda_n$ from the aggregate side may be passed to any of m aggregate sides in the wavelength unit as its optical signals $\lambda_1 \sim \lambda_n$.

In the above-described embodiment, the optical multiplexing conversion unit 27 and the optical demultiplexing conversion unit 28 described in FIGS. 7 to 9 are used. However, the optical multiplexing conversion unit 27' and optical demultiplexing conversion unit 28' described in FIGS. 10 to 12 may also be used.

In this embodiment, (i+j+k) relatively low-speed optical signals are converted to electrical signals, time-division multiplexed, and then converted to high-speed optical signals with one or more wavelengths. Conversely, high-speed optical signals with one or more wavelengths are converted to electrical signals and time-division demultiplexed, and converted into (i+j+k) relatively low-speed optical signals. This alleviates the limit of the number of wavelengths, so that an optical cross-connect type optical gateway equipment capable of highly efficient transmission can be obtained.

Figure 14:
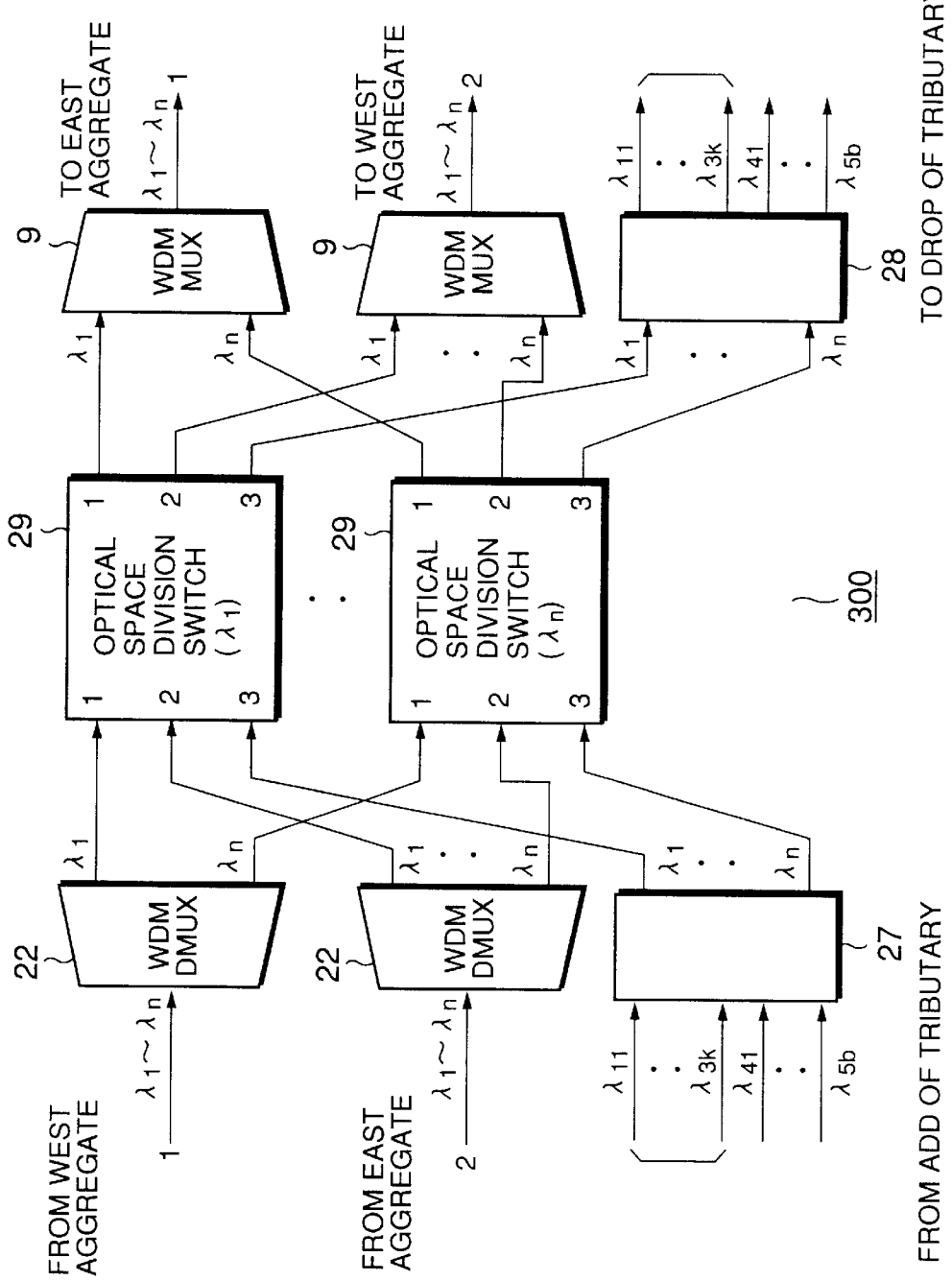
FIG. 14 is a diagram showing the configuration of OADM type optical gateway equipment used in the embodiment of the present invention.

Another embodiment according to the present invention will be described with reference to FIG. 14. An OADM optical gateway equipment is used in the present embodiment. On the aggregate side, there are two input optical signals and two output optical signals, each composed of n multiplexed optical signals with wavelengths $\lambda_1 \sim \lambda_n$: one for the West side and the other for the East side. On the tributary side, there are input and output demultiplexed optical signals, each composed of optical signals $\lambda_{11} \ldots \lambda_{3k}$ and optical signals $\lambda_{41} \ldots \lambda_{5b}$. When adding signals on the tributary side, the optical multiplexing conversion unit 27 described above aggregates the optical signal $\lambda_{11} \ldots \lambda_{3k}$ into the optical signal $\lambda_1$ and converts the optical signals $\lambda_{41} \ldots \lambda_{5b}$ to optical signals $\lambda_2 \ldots \lambda_n$. They are input to the optical space division switch 29. These optical signals $\lambda_1 \ldots \lambda_n$ are switched by the optical space division switch 29, wavelength-multiplexed by the WDM MUX 9, added to the optical signals $\lambda_1 \sim \lambda_n$, and output to the East aggregate side 1 and the West aggregate side 2. As shown in the figure, if the corresponding output port is selected in the optical space division switch 29, the optical signals may be dropped onto the tributary side instead of being added to the aggregate side.

The optical signals $\lambda_1 \sim \lambda_n$ from the West aggregate side 1 and the East aggregate side 2 are demultiplexed by the WDM DMUX 22 to optical signals $\lambda_1 \ldots \lambda_n$ and are input to the optical space division switch 29. These optical signals $\lambda_1 \ldots \lambda_n$ are switched by the optical space division switch 29. The signals dropped onto the tributary side are converted to optical signals $\lambda_{11} \ldots \lambda_{3k}$ (generated by demultiplexing the optical signal $\lambda_1$) and optical signals $\lambda_{41} \ldots \lambda_{5b}$. As shown in the figure, when the optical space division switch 29 selects the corresponding output port, the optical signals $\lambda_1 \sim \lambda_n$ from the West aggregate side 1 and East aggregate side 2 may be passed to the East aggregate side 1 and the West aggregate side 2 as the optical signals $\lambda_1 \sim \lambda_n$ by the wavelength base.

In the above-described embodiment, the optical multiplexing conversion unit 27 and the optical demultiplexing conversion unit 28 described in FIGS. 7 to 9 are used. The optical multiplexing conversion unit 27' and optical demultiplexing conversion unit 28' described in FIGS. 10 to 12 may also be used.

In this embodiment, (i+j+k) relatively low-speed optical signals are converted to electrical signals, time-division multiplexed, and then converted to high-speed optical signals with one or more wavelengths. Conversely, high-speed optical signals with one or more wavelengths are converted to electrical signals and time-division demultiplexed, and converted into (i+j+k) relatively low-speed optical signals. This alleviates the limit of the number of wavelengths, providing an OADM type optical gateway equipment capable of highly efficient transmission.

FIGS. 15 to 17 show a network in which the optical gateway equipment according to the present invention is applied to an optical network.

FIG. 15 shows how the Optical Gateway Multiplexer (OGM) 100 according to the present invention is applied to the backbone network. In this embodiment, the optical gateway multiplexer (OGM) 100-1 aggregates relatively low-speed 150 Mb/s optical signals $\lambda_{11} \ldots \lambda_{1i}$, 600 Mb/s optical signals $\lambda_{21} \ldots \lambda_{2j}$, and 2.4 Gb/s optical signals $\lambda_{31} \ldots \lambda_{3k}$ from OADM ring 1 of an access network to $\lambda_1$, converts optical signals $\lambda_{41} \ldots \lambda_{4a}$ and optical signals $\lambda_{51} \ldots \lambda_{5b}$ from OADM rings 2 and 3 of the access network to the optical signals $\lambda_2 \ldots \lambda_n$, multiplexes them to optical signals $\lambda_1 \ldots \lambda_n$ in the WDM mode, and sends them to an optical gateway equipment 100-2 on the other end which is connected in the point-to-point connection mode.

The optical gateway equipment 100-2 on the other end transmits the demultiplexed 150 Mb/s optical signal $\lambda_{11} \ldots \lambda_{1i}$, 600 Mb/s optical signals $\lambda_{21} \ldots \lambda_{2j}$, and 2.4 Gb/s optical signals $\lambda_{31} \ldots \lambda_{3k}$ to an OADM ring in the access network not shown in the figure.

The two units of gateway equipment connected in the point-to-point mode may be gateway equipment 100'.

Next, the optical path routing method using the optical gateway equipment used in the present embodiment will be described.

As shown in FIG. 8 or 11, the optical gateway equipment used in this embodiment allocates relatively low-speed tributary side optical signals $\lambda_{11} \ldots \lambda_{1i}, \lambda_{21} \ldots \lambda_{2j}$, and $\lambda_{31} \ldots \lambda_{3k}$ (i+j+k) wavelengths to the aggregate side optical signal $\lambda_1$ with one wavelength. That is, a specific wavelength of the signals on the aggregate side ($\lambda_1$) is virtually treated as if it was composed of (i+j+k) wavelengths. One signal with this specific wavelength is routed through the backbone optical network to route (i+j+k) optical signals together. The signal is then demultiplexed by another optical gateway equipment to signals with (i+j+k) wavelengths for routing through the optical network.

Therefore, as shown in FIG. 15, two optical gateway multiplexers 100 are paired oppositely in the optical network. In the embodiment shown in FIG. 15, the optical signal $\lambda_1$ with one specific wavelength is routed between two units of the optical gateway equipment 100-1, 100-2 in the backbone network. Optical path routing is performed in the optical network in this way.

FIG. 16 shows a case where the Optical Gateway Cross-Connect (OGXC) 200 according to the present invention is applied to an OXC mesh backbone network. FIG. 17 shows a case where the Optical Gateway Add Drop Multiplexer (OGADM) 300 according to the present invention is applied to the OADM ring backbone network. The operation in these networks is the same as that of the embodiment shown in FIG. 15. The optical path routing method using the optical gateway (OGXC or OGADM) shown in FIG. 16 and FIG. 17 is also the same as that of the embodiment shown in FIG. 15.

As described above, the present invention provides an optical network element (O-NE) and optical transmission equipment that may be used in a large optical network in which wavelength based multiplexing and routing are performed.

What is claimed is:

1. Optical transmission equipment, comprising:
    a multiplexing unit that multiplexes a plurality of optical signals having multiple wavelengths and;
    a demultiplexing unit that demultiplexes a multiplexed optical signal;
    wherein said multiplexing unit comprises:
        an optical multiplexing conversion unit having a plurality of optical/electrical conversion units which convert a portion of said plurality of optical signals to a plurality of electrical signals;
        a time-division multiplexing unit which time-division multiplexes said plurality of electrical signals from said optical/electrical conversion units to a first high-speed electrical signal;
        an electrical/optical conversion unit which converts said first high speed electrical signal to a first high speed optical signal,
    said optical transmission equipment further comprises:
        a wavelength multiplexing unit which wavelengths-multiplexes optical signals including a remaining portion of said plurality of optical signals with a plurality of different wavelengths, and said first high-speed optical signal; and
    wherein said demultiplexing unit comprises:
        a wavelength demultiplexing unit which wavelength demultiplexes a wavelength-multiplexed optical signal to a plurality of optical signals with a plurality of different wavelengths, said plurality of optical signals including said first high speed optical signal and a remaining portion of wavelength demultiplexed optical signals;
        at least one optical/electrical conversion unit which converts said first high-speed optical signal to said high-speed electrical signal;
        a time-division demultiplexing unit which demultiplexes said first high-speed electrical signal to a plurality of electrical signals;
        a plurality of electrical/optical conversion units which convert said plurality of electrical signals to optical signals having different wavelengths; and
        a plurality of optical/electrical/optical conversion units which convert said remaining portion of wavelength demultiplexed optical signals to a plurality of optical signals each having different wavelengths.

2. Optical transmission equipment according to claim 1, wherein said time-division multiplexing unit outputs a plurality of high-speed electrical signals.

3. Optical transmission equipment according to claim 1, wherein said time-division demultiplexing unit converts said plurality of high-speed electrical signals into optical signals.

4. A method of optical transmission comprising the steps of:
    multiplexing a plurality of optical signals having multiple wavelengths and demultiplexing said multiplexed optical signals,
    wherein said multiplexing step comprises the steps of:
        converting a portion of said optical signals having multiple wavelengths to electrical signals;
        time-division multiplexing said converted electrical signals to a first high-speed electrical signal;
        converting said first high speed electrical signal into a first high speed optical signal via an electrical/optical conversion unit; and
        wavelength multiplexing a remaining portion of said optical signals having multiple wavelengths, and said first high-speed optical signal; and wherein said demultiplexing step comprises the steps of:
  wavelength-demultiplexing a wavelength-multiplexed optical signal into a plurality of wavelength demultiplexed optical signals, said first high-speed optical signal being one of said plurality of wavelength-demultiplexed signals;
  converting said first high speed optical signal into said first high speed electrical signal;
  time-division demultiplexing said first high-speed electrical signal to a plurality of electrical signals;
  converting said plurality of electrical signals to optical signals each having different wavelengths; and
  converting a remaining portion of said plurality of wavelength demultiplexed optical signals into optical signals each having different wavelengths.

* * * * *